No. 860,804. PATENTED JULY 23, 1907.
C. O. HESCOX.
DISH WASHER.
APPLICATION FILED FEB. 25, 1904.

3 SHEETS—SHEET 1.

Witnesses.

Charles O. Hescox
INVENTOR
By R. J. Elliott
HIS ATTORNEY

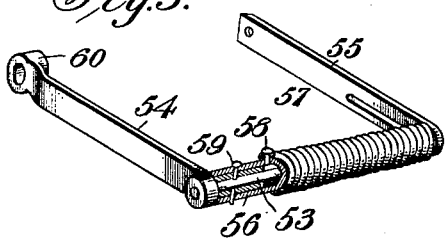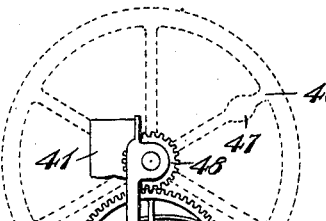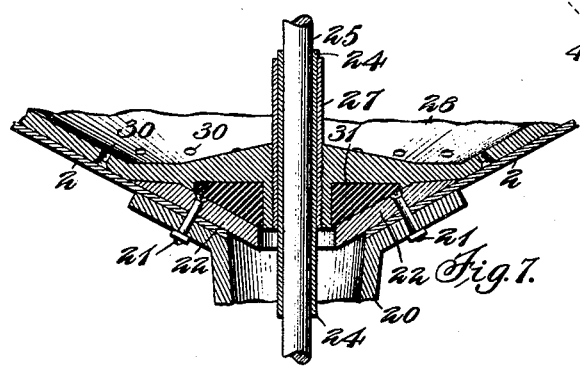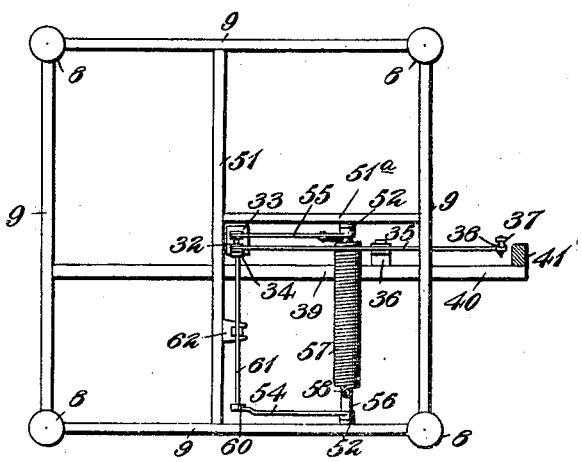

UNITED STATES PATENT OFFICE.

CHARLES O. HESCOX, OF TACOMA, WASHINGTON.

DISH-WASHER.

No. 860,804.  Specification of Letters Patent.  Patented July 23, 1907.

Application filed February 25, 1904. Serial No. 195,227.

*To all whom it may concern:*

Be it known that I, CHARLES O. HESCOX, a citizen of the United States, residing at Tacoma, in the county of Pierce and State of Washington, have invented certain new and useful Improvements in Dish-Washers, of which the following is a specification.

My invention relates to dish washing machines and consists of improvements in that style of dish washing machines patented by W. E. Leonard and myself on July 19th, 1898, and numbered 607,515; by means of these improvements I have been able to overcome the deficiencies of said machine, more particularly in preventing the leakage of water along the dasher rod, and in the means for actuating the dasher.

My invention is illustrated in the accompanying drawings, in which

Figure 1:
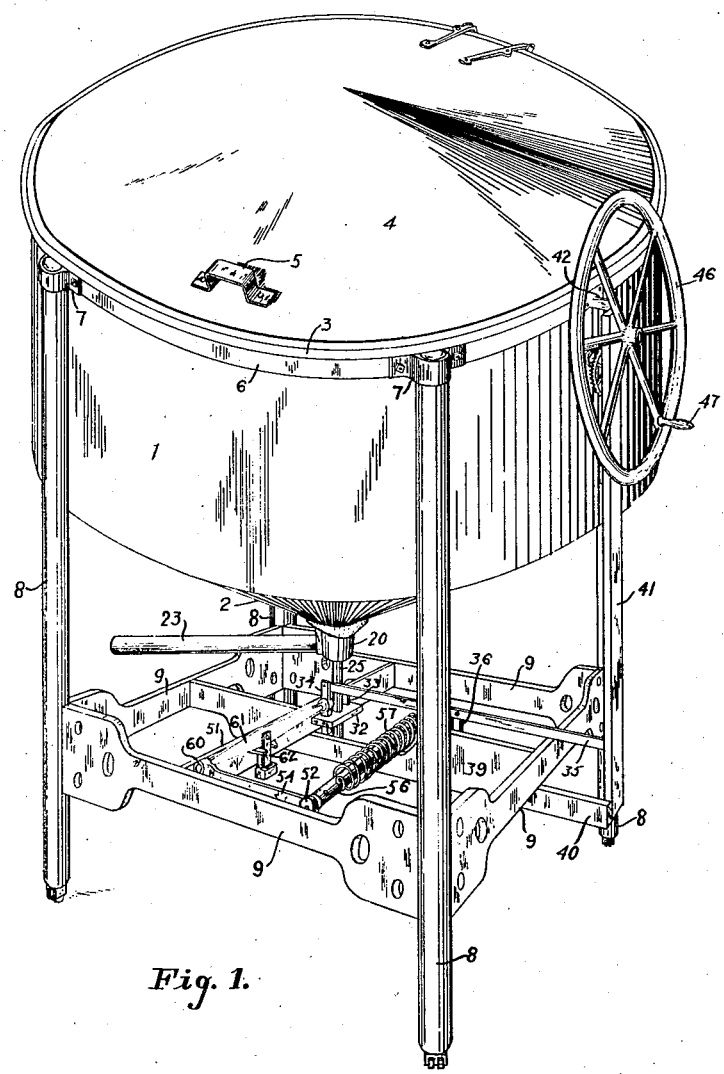
Figure 2:
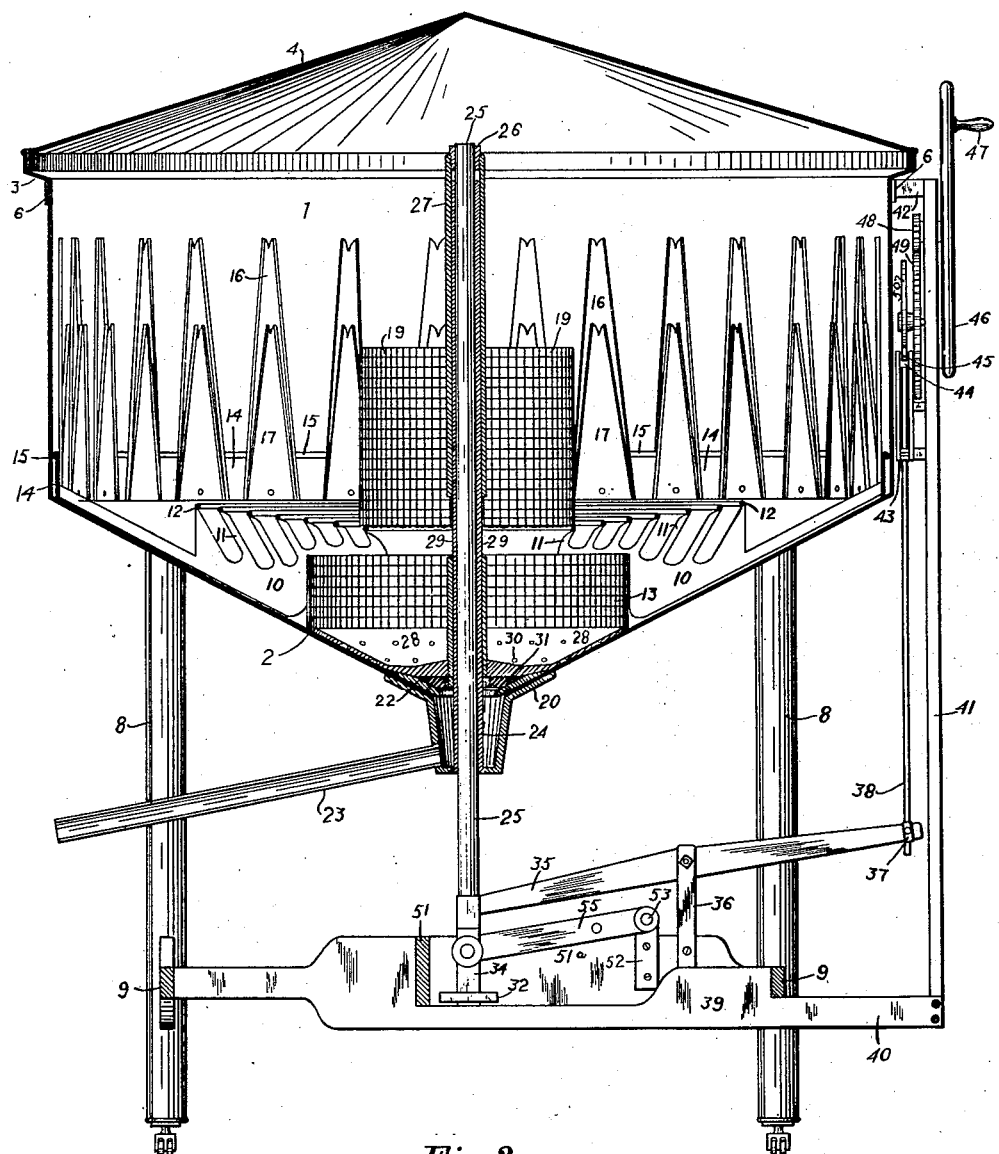

Figure 1 is a perspective view of my machine. Fig. 2 is a vertical section thereof. Fig. 3 is a perspective view, partly in section, of the operating spring mechanism. Fig. 4 is a partial side view of the cam operating mechanism. Fig. 5 is a perspective view of the dasher pipe. Fig. 6 is a plan of the operator spring mechanism, and Fig. 7 is an enlarged sectional view of a part of the dasher.

Similar numerals of reference refer to similar parts throughout the several views.

The dish pan "1" is cylindrical and is provided with an inverted conical bottom "2". The upper rim of the pan "1" is bent to form a shoulder "3" around the pan, into which the cover or lid "4" fits, said cover being preferably hinged to the pan "1" and is also provided with a suitable handle "5".

The pan "1" is hung from the shoulder "3" by a strap "6" which passes entirely around the pan but which is not secured thereto, the said strap having sockets "7" secured thereto at suitable points to receive the ends of the legs "8" which support the entire machine.

The legs "8" are secured together below the pan "1" by the outer frame pieces "9" which form a frame which independently supports the dasher operating mechanism.

Within the pan "1" is placed the dish tray consisting of arms "10" arranged radially on the bottom "2" of the pan and having fingers "11" projecting upward to which are secured by any suitable means the wires "12" extending in circular or spiral form around the pan. A wire network "13" is secured to the bottom "2" of the pan around the dasher space in order to keep small dishes, silverware, etc., from getting under the dasher when it is in operation. The arms "10" are all secured at their outer ends to the galvanized iron band "14" which fits loosely in the pan "1" and which is strengthened by the wire "15" soldered to its upper edge. The glass and cup holders "16" and "17" extend almost vertically upward from the band "14".

The holders "17" are placed in front of the holders "16" and are tilted therefrom at their upper ends but are secured together at their lower ends. These holders do not form an essential part of my invention and are only illustrated and briefly described to complete the machine, it being understood that any device which will hold such articles in an inverted position and which may be otherwise adapted for this machine may be used therein without affecting my invention.

The silverware basket "19" rests on the innermost wire "12" of the dish tray and is made of wire netting, open at the top and provided with a central hole in its bottom through which the dasher operating tube passes.

The catch basin "20" is secured to the apex of the inverted conical bottom "2" by the bolts "21" passing through it and through a reinforcing ring "22" on the inner side of the bottom "2". The ring "22" projects over the sides of the catch basin "20" and has its central opening only slightly larger than the dasher pipe. A large waste pipe "23" closed by any suitable means leads from the catch basin "20".

A vertical stationary pipe "24" is screwed into a hole in the bottom of the basin "20" and extends upward therefrom, inside the pan, to a point about on a level with the shoulders "3", and is open at the top and bottom.

The dasher rod "25" fits loosely in the pipe "24" and extends from below the pan where it is secured to the driving mechanism, to a point above and beyond the pipe "24" and is provided at its upper end with an enlargement "26", screw threaded on its outer surface, which screws into the upper end of the dasher pipe "27" which is outside of the stationary pipe "24", thus securing the dasher rod "25" within the pipe "24" to the dasher pipe "27" outside of the pipe "24". Slots "29" are made in the pipe "27" at points above the usual height of the water in the pan so that if any water enters between the pipes "24" and "27" it will return into the pan through the slots "29" before it reaches the top of the stationary pipe "24".

The dasher "28" is secured to the lower end of the pipe "27" and is of a generally conical shape and provided with conical holes "30" through it, said holes having their larger diameters lowermost. The central portion of the dasher is shaped to fit the ring "22" and to hold and retain the rubber buffer "31" which is adapted to strike the ring "22" before the dasher reaches the bottom "2".

The above mentioned dasher rod "25" is secured at its lower end to the cross head "32" which is also provided with projections "33" and "34" on each side of the rod "25". The projection "33" has one arm "55" of the torsional spring mechanism pivoted to it so as to act downwards thereon to force the dasher down when it has been elevated and released, while the other projection "34" is engaged by the end of the walking beam "61" which is actuated at its other end in the opposite direction by the other arm "54" of the same torsional spring mechanism which therefore also acts downwards on the cross head "32".

The above mentioned arms "54" and "55" and the torsional spring mechanism and the walking beam "61" constitute the dasher actuating mechanism while the devices about to be described for elevating the dasher against the action of the said actuating mechanism constitute the operating mechanism. This operating mechanism consists of a lever "35" engaging at one end the projection "34", and is pivoted at its center to the piece "36" secured to the frame in such a manner as to allow a slight movement. The other end of the lever "35" fits loosely in a socket "37" secured to the vertical operating rod "38".

The bar "39" extends across the frame formed by the pieces "9" and is provided with an extension "40" therefrom. The supporting bracket bar "41" is secured to the end of the extension "40" and passes vertically therefrom beside the pan "1", and is secured to the band "6" by means of a bracket "42". This bracket bar supports the entire operating mechanism from the frame of the machine and is entirely independent of any connection with the pan. The bar "41" is also provided with guides "43" so as to guide the rod "38" in its vertical movements.

The rod "38" is provided at its upper end with a head "44" carrying a roller "45" to be engaged and pressed downward by the cam wheel of the operating mechanism.

The handwheel "46" is journaled to the bracket "41" and has a handle "47" secured to its outer surface. The shaft of the wheel "46" extends through the journal casting mounted on the bracket bar "41" and has a pinion "48" mounted thereon on the inner side of the bar "41". The same journal casting also has a shaft secured thereto and extending inwards therefrom on which is mounted the gear "49" engaged by the pinion "48". The gear "49" carries the cam "50" which is in line with and adapted to engage the roller "45" of the head "44" of the rod "38". The shape of the cam "50" is such that as it turns on its axis the outer edge at the point where it engages the roller "45" constantly recedes from its axis for almost a complete rotation and then it returns practically radially to the point of beginning. Thus as the cam turns the roller "45", rod "38" and the outer end of the lever "35" are depressed while the inner end of the lever "35", the cross head "32", the rod "25", pipe "27" and dasher "28" are all equally elevated against the action of the torsional spring actuating mechanism, until the radial part of the cam is reached by the roller "45" when the above parts are suddenly released from engagement with the cam and the torsional spring actuating mechanism is given full play to return the dasher "28" to the bottom and all of the parts to their relaxed positions.

The interior cross bar "51" of the frame extends between the frames "9" and has a short bar "51ᵃ" extending between it and the parallel frame "9" said short bar being parallel with and a short distance from the bar "39". The two bearing castings "52" are secured at opposite points to one of the frames "9" and to the short bar "51ᵃ" respectively and hold between them the rod "53", of the torsional spring mechanism, which is free to turn in said bearing castings. The arm "54" above mentioned is secured to one end of the rod "53". The arm "55" is mounted on the rod "53" but is loose thereon. A pipe "56" is loosely mounted on the rod "53" between the arms "54" and "55". A torsional spring "57" is coiled around the pipe "56" having one end secured to the pipe by a pin "58" and the other end extending outward and engaging the loose arm "55". The pipe "56" is adjustably secured to the rod "53" by a pin "59" which passes through a hole in said parts and the tightness of the spring may be regulated by removing the pin "59" from the hole and twisting the pipe "56" in one direction or the other relatively to the rod "53" and then pinning the parts together again. The arm "55" is connected to the projection "33" of the crosshead "32" as above mentioned. The arm "54" has a socket "60" formed at its end adapted to receive the ball in the end of the walking beam "61". This walking arm "61" is pivoted at its center to the piece "62" which is loosely mounted on the bar "51" of the frame. The other end of the walking beam engages the projection "34" of the crosshead "32" as above mentioned.

Having described my invention, what I claim is:

1. In a dish washer, the combination with a dish pan adapted to receive dishes and water, of a stationary tube secured in said dish pan and having open ends, a pipe surrounding said tube and adapted to slide thereon and having slots cut in its sides above the normal water height and below the top of said tube, a dasher secured to the lower end of said pipe, and means for operating said pipe and dasher.

2. In a dish washer, the combination of a frame, a dish pan mounted thereon, a vertically acting dasher therein, a rod secured to said dasher and passing outside of and below said pan, a walking beam pivoted to the frame and connected at one end to the rod, a spring acting on both the ends of said walking beam in opposite directions to force said rod downwards, a lever pivoted to the frame and engaging the rod and acting against said spring, and a rotating cam having a sudden release and actuating said lever to raise the dasher and allowing said spring to return the dasher when said cam releases said lever.

Signed at Tacoma this 19th day of February, 1904.

CHARLES O. HESCOX.

Witnesses:
W. E. WINDSOR,
FREDERIC J. SHAW.